United States Patent [19]
Freiberger et al.

[11] Patent Number: 5,511,724
[45] Date of Patent: Apr. 30, 1996

[54] ADAPTIVE CLIMATE CONTROL SYSTEM

[75] Inventors: Ronald D. Freiberger, Kokomo; Peter A. Thayer, Indianapolis, both of Ind.; Diane M. Wills, San Diego, Calif.

[73] Assignee: Delco Electronics Corporation, Kokomo, Ind.

[21] Appl. No.: 344,189

[22] Filed: Nov. 23, 1994

[51] Int. Cl.$^6$ .................................................. F24F 7/00
[52] U.S. Cl. .................... 236/49.3; 236/91 F; 165/16; 165/42; 454/75; 62/244; 62/186
[58] Field of Search ................... 236/49.3, 49.1, 236/91 R, 91 C, 91 F, 91 E, 94, 78 D; 165/12, 16, 42, 43, 35, 36; 62/239, 244, 161, 162, 163, 164, 180, 186, 173; 454/75, 229, 256, 258

[56] References Cited

U.S. PATENT DOCUMENTS

| | | | |
|---|---|---|---|
| 4,914,924 | 4/1990 | Takahashi | 236/91 C X |
| 5,078,316 | 1/1992 | Hara et al. | 236/49.3 |
| 5,145,112 | 9/1992 | Ueda | 165/12 X |
| 5,220,805 | 6/1993 | Fukudomi | 62/244 X |
| 5,293,928 | 3/1994 | Iida et al. | 165/16 |
| 5,344,070 | 9/1994 | Akasaka et al. | 236/49.3 |
| 5,427,313 | 6/1995 | Davis, Jr. et al. | 236/49.3 |

*Primary Examiner*—Harry B. Tanner
*Attorney, Agent, or Firm*—Jimmy L. Funke

[57] ABSTRACT

An adaptive electronic climate control (ECC) system for a vehicle that allows adjustments to the temperature setting and blower speed controls of the ECC system to teach the system to automatically be set to the vehicle operator's comfort level. If the vehicle operator adjusts the temperature set point at a particular ambient air temperature, the system will store this change for that ambient air temperature. Once the change has been validated, the next time the system encounters that ambient air temperature, the system will automatically provide the appropriate air mixture as previously set by the vehicle operator. Further, when the vehicle operator adjusts the blower speed, the system will gradually adapt the blower speed to that which is set by the vehicle operator for a particular set of vehicle parameters that affect the climate within the vehicle.

24 Claims, 5 Drawing Sheets

- • NEW BLOWER TABLE POINTS
- ○ OLD BLOWER TABLE POINTS

ADAPTIVE CLIMATE CONTROL SYSTEM

BACKGROUND OF THE INVENTION

1. Field of the Invention

This invention relates generally to an adaptive climate control system and, more particularly, to a climate control system for controlling the climate within the passenger compartment of a vehicle where manual adjustments to the climate control system by a vehicle operator are processed to adapt the climate control system to the comfort level of the operator.

2. Discussion of the Related Art

Figure 1:
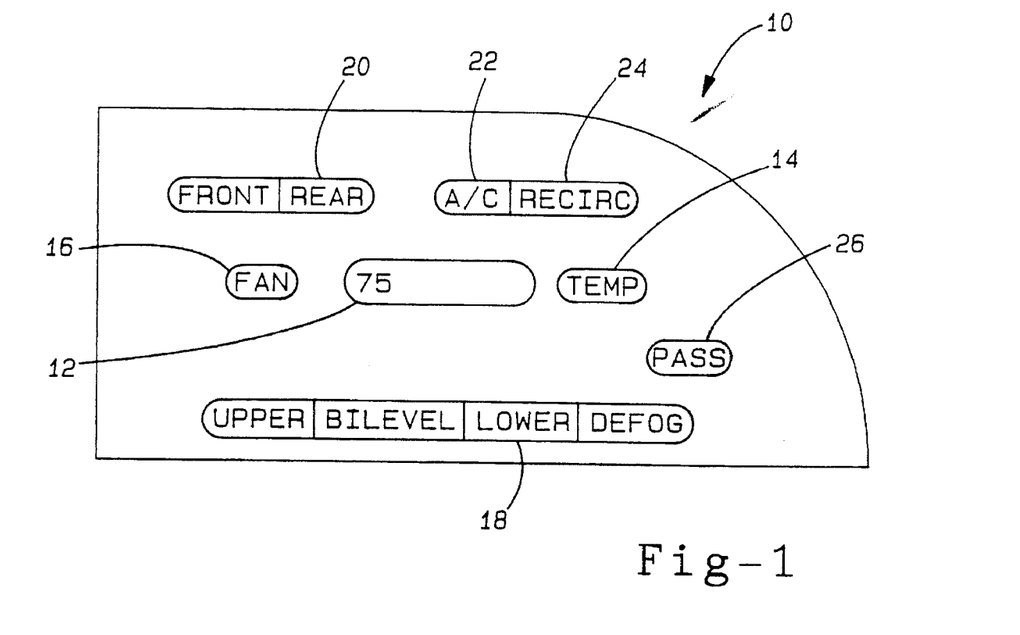
FIG. 1 is a diagrammatic illustration of the controls for an electronic climate control system associated with a vehicle.

As is well understood, a number of controls, such as blower speed control, temperature control and vent control, that control a heating ventilating and air conditioning (HVAC) system associated with a vehicle enable a vehicle operator to regulate the climate within the vehicle. FIG. 1 shows a diagrammatic view of a typical control panel 10 for such an HVAC system. The control panel 10 includes a display 12 that displays a temperature setting, generally based on the Fahrenheit temperature scale. The temperature setting represents a scaled value that allows the HVAC system to deliver an air mixture to the passenger compartment of the vehicle at a particular temperature. A temperature set control button 14 enables the vehicle operator to adjust the temperature setting in order to raise or lower the temperature over a predetermined temperature range. A blower speed control button 16 allows the vehicle operator to change the speed of a blower that delivers the air mixture at the desired temperature to the blower vents so as to adjust the rate at which the air mixture is delivered to the passenger compartment of the vehicle. The blower speed may also be shown within the display 12. Vent control buttons 18, shown here as upper, bi-level, lower, and defog controls, allows the vehicle operator to determine which vents will deliver the air mixture at the set blower speed. Front and rear control buttons 20 allow the vehicle operator to select front and rear defrost. An air conditioning (A/C) control button 22 allows the vehicle operator to select air conditioning for cooling. A recirculation control button 24 recirculates the vehicle compartment air during extreme climate conditions. A pass button 26 allows a vehicle passenger to switch control of the HVAC system to a passenger control panel. Each of the above-discussed controls are well known controls of a vehicle climate control system.

Advancements in HVAC systems for controlling the climate within a vehicle have lead to electronic climate control (ECC) systems that will automatically control the climate within the passenger compartment of the vehicle based on a number of parameters that effect the climate within the vehicle. The parameters are preprogrammed and calibrated to a particular comfort level by a climate control calibration engineer at the manufacturing level of the vehicle. An automatic control button allows the vehicle user to put the ECC system into the automatic mode. For the control panel 10, the automatic mode can be selected by pressing the temperature set button 14. In the automatic mode, the ECC system will attempt to regulate air delivery and air mixture based on the preprogrammed parameters. If the vehicle operator adjusts the blower speed, or any other control button on the control panel 110 besides the temperature set control button 14, the ECC system will be removed from the automatic mode, and will remain at the settings as set by the vehicle operator. The goal of an automatic ECC system is to provide the most desirable comfort level within the vehicle compartment with a minimal amount of control input by the vehicle operator.

One automatic ECC system, developed by Delco Electronics, uses the ambient air temperature outside of the vehicle ($T_{out}$), the temperature within the vehicle compartment converted to digital counts ($T_{IN}$), the solar load ($T_{SL}$) on the vehicle, the temperature setting that is set by the vehicle operator ($T_{SET}$), and a calibration constant (K) as the parameters for determining the automatic climate control. The ambient air temperature $T_{out}$ is sensed by a temperature sensor that provides a voltage representation of $T_{OUT}$. The voltage is applied to an ambient air corrections (ACOR) table that provides an indicative ambient temperature corrections factor $F_{ACOR}$ based on the ambient air temperature $T_{OUT}$. For this system, the ACOR table includes thirty-two data points for representing the entire range of the sensed ambient air temperatures. The ACOR values are determined by interpolating the voltage representation of the ambient air temperature across the ACOR table data points. Therefore, each ACOR table value represents a range of temperatures.

An algorithm has been devised for controlling a single zone automatic ECC system that correlates these parameters into one control variable program number (NPRG). This algorithm is given by:

$$NPRG=2T_{IN}+5T_{SET}+F_{ACOR}+T_{SL}+K.$$

The NPRG value is the value by which the automatic ECC system determines the appropriate blower speed, vent mode and air mixture in order to set the climate within the vehicle. The calculation for the NPRG value can also include a compensation for other zones. In the system described above, the NPRG value can be between 0 and 256 based on an eight bit digital data byte. A high NPRG value indicates that the ambient air temperature and the vehicle compartment air temperature are relatively cold, and therefore heat should be delivered at a high blower speed. Likewise, a low NPRG value indicates that the ambient air temperature and the vehicle compartment air temperature are relatively high, and therefore cool air should be delivered at a high blower speed. Each NPRG value allows the automatic ECC system to know to provide a certain air mixture at a certain blower speed to achieve the value of $T_{SET}$.

As mentioned above, the NPRG value will cause the system to select which of the blower outlet vents will receive what proportion of the blower capacity, and the particular blower speed for the environmental conditions. When the automatic ECC system calculates a NPRG value, it will then refer to a blower look-up table in order to determine the appropriate blower speed. Like the ACOR table, the blower look-up table has thirty-two data points. The NPRG value is interpolated across the blower look-up table such that each data point in the blower look-up table represents a range of NPRG values. Therefore, for example, if a vehicle operator enters the vehicle on a hot day, the automatic ECC system will provide the quickest way of achieving the temperature set point by providing the best possible air temperature mixture, blower speed and blower vent mode.

The automatic ECC system discussed above is intended to automatically provide the most desirable vehicle climate for the vehicle operator. In order to set the controls that determine the appropriate air mixture, blower speed and blower vent mode for a particular NPRG value for a wide-range of environmental conditions, a calibration engineer sets the blower speed and the air mixture for each NPRG value based on his preference or the preference of a minimal cross section of people. The calibration constant K enables the calibration engineer to insert a parameter into the calculation of the NPRG value that adjusts the NPRG value for each combination of $T_{IN}$, $T_{OUT}$, $T_{SET}$ and $T_{SL}$ based on the engineer's preferences.

An inherent problem exists in the above described system. That is, the vehicle operator may desire a different vehicle compartment temperature than that as calibrated by the calibration engineer at a particular $T_{SET}$ value with respect to the other parameters. Further, known automatic ECC system do not account for sensitivity to blower noise. High blower speeds may provide annoying circumstances to certain individuals. Therefore, some vehicle operators may consistently adjust the climate controls, thus removing the system from the automatic mode. These operators will therefore not benefit from the automatic climate control system.

What is needed is an adaptive climate control system that allows the automatic ECC system to be calibrated to a particular vehicle operator so that the automatic ECC system will be specifically adaptable to that particular vehicle operator, and thus minimize vehicle operator control changes to the climate control system. It is therefore an object of the present invention to provide such an adaptive climate control system.

SUMMARY OF THE INVENTION

In accordance with the teachings of the present invention, an adaptive electronic climate control (ECC) system for a vehicle is disclosed. The adaptive ECC system allows adjustments to the controls of the ECC system to teach the system to automatically be set to the vehicle operator's comfort level. If the vehicle operator adjusts the temperature set point at a particular ambient air temperature, the system will store this change for that ambient air temperature. Once the change has been validated, the next time the system encounters that ambient air temperature, or an ambient air temperature around that ambient air temperature, and the corresponding NPRG value, the system will automatically provide the appropriate air mixture as previously set by the vehicle operator. In one embodiment, the system tunes the temperature setting to be set at approximately 75 at the vehicle operator's comfort level.

Likewise, as the vehicle operator adjusts the blower speed for a particular NPRG value, the system will gradually move the blower speed to the preference of the vehicle operator. Each time a change in blower speed has been validated at a particular NPRG value, the system will adapt a blower table value for a range around the NPRG value a proportional amount of the difference between the blower speed setting as set by the vehicle operator and the original blower speed setting. Also, the system will reduce the blower speed a proportional amount. If the vehicle operator maintains the current set blower speed, and this blower speed is again validated, the system will again adjust the blower table value for a range around the NPRG value the proportional amount, and change the actual blower speed towards the original blower speed the proportional amount. Therefore, the system is adapted to the vehicle operator's blower speed preference, and the vehicle operator is adapted toward the calibrated blower speed.

Additional objects, advantages, and features of the present invention will become apparent from the following description and the amended claims, taken in conjunction with the accompanying drawings.

DETAILED DESCRIPTION OF THE PREFERRED EMBODIMENT

The following discussion of the preferred embodiments concerning an adaptive electronic climate control system for automatically controlling the environment within the passenger compartment of a vehicle is merely exemplary in nature and is in no way intended to limit the invention or its applications or uses. Particularly, the adaptive climate control system of the invention will be discussed as an improvement on the already existing automatic ECC system as developed by Delco Electronics discussed above, however, it can be readily implemented into other climate control systems.

For the adaptive climate control system of the present invention, the parameters of vehicle compartment air temperature $T_{IN}$, ambient air temperature $T_{OUT}$, temperature setting $T_{SET}$, solar load $T_{SL}$ on the vehicle, and the calibration constant K are all parameters of the control system that are used to generate the program number NPRG, in the manner as discussed above, that determines an appropriate air mixture and blower speed, as well as blower vent modes. As with the existing automatic ECC system, the adaptive ECC system will attempt to maintain the internal temperature of the vehicle constant at the $T_{SET}$ temperature setting. The primary difference is that as the vehicle operator adjusts $T_{SET}$ and the blower speed during the normal course of operating the vehicle, the system will change the correction constant K, the corresponding ACOR factor at the particular outside air temperature, and the blower table value at the corresponding program number NPRG in response to the operator's intervention with the controls, so as to adjust the automatic control to the operator's preferences. As can be gleaned from the discussion above, modifications to the ACOR table are seasonal changes, whereas modifications to the correction constant K are overall changes.

A description of the invention will first be given for adaptation of air mixture, i.e., the temperature of the air being delivered to the passenger compartment of the vehicle. The system will adapt to the preferences of a particular vehicle operator for air mixture over time as a result of the operator adjusting the temperature set button 14. In the embodiment being discussed, the $T_{SET}$ has a range of between 50 and 90, representing an approximate correlation to degrees Fahrenheit. When $T_{SET}$ is decreased to 64, the setting will automatically go to 60 representing maximum cool. When $T_{SET}$ is increased to 86, the setting will automatically go to 90 representing maximum heat. As will become apparent from the discussion below, the goal of the adaptive ECC system, according to one embodiment, is to calibrate the temperature setting at 75±1 at the vehicle operator's comfort level. In this manner, the vehicle operator will have the full range of temperature settings above and below the 75 temperature setting in which to adjust the air mixture. It will be understood, however, that the adaptive ECC system is equally applicable to other temperature setting ranges.

Figure 2:
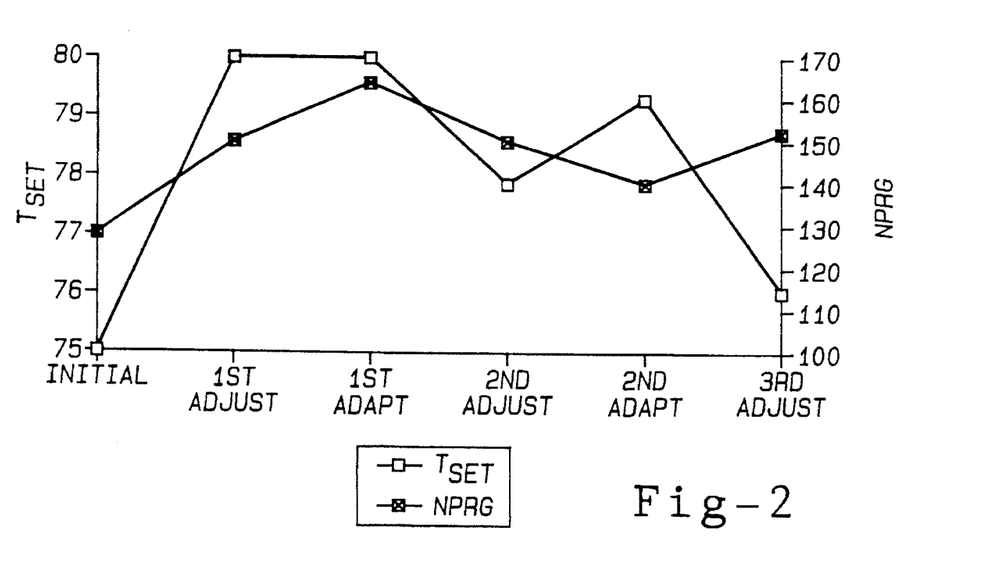
FIG. 2 is a graph depicting driver adjustments and system adaptations by an adaptive electronic climate control system for adapting temperature according to a preferred embodiment of the present invention.

FIG. 2 is a graph that illustrates adjustments a vehicle operator has made to the temperature setting as originally set by the calibration engineer. In order to simplify the discussion, this illustration is based on a fixed vehicle environment. In other words, the graph of FIG. 2 assumes that $T_{OUT}$ and $T_{SL}$ remain constant. Of course this will not be the case in a practical environment, however, for illustration purposes to describe the adaptation of the temperature setting to a particular vehicle operator, this discussion will be adequate. The left vertical axis represents the temperature set point $T_{SET}$, the right vertical axis represents the corresponding NPRG value, and the horizontal axis indicates adjustments by the vehicle operator and adaptations by the system. The open square data points represent the temperature setting as shown in the display 12, and the closed square data points represent the NPRG value for the displayed temperature setting at that particular time.

The initial $T_{SET}$ of 75 as set by the calibration engineer at these specific environmental conditions gives an NPRG value of approximately 128. This setting is too cool for the vehicle operator at the current outside temperature, who then initially adjusts the control button 14 to the temperature setting 80 as will be shown in the display 12. This gives an NPRG value of 153 as indicated at the first adjustment point. This indicates that the vehicle operator is comfortable at a target NPRG value of 153 for the particular environmental conditions. However, the system will try and make the vehicle operator be comfortable at a $T_{SET}$ value of about 75. In this embodiment, the system will add (80–75)×5×25% to the currently stored correction constant K value, and (80–75)×5×25% to the ACOR table value for the current ambient temperature $T_{OUT}$. A factor of 5 is used because the calculation of the NPRG value included $5T_{SET}$. Twenty five percent is an arbitrary proportionate amount of the operator's change that is selected as a value that will make gradual changes to the correction constant K and the ACOR table value from adjustments by the vehicle operator so as to gradually arrive at the vehicle operator's comfort level. Of course other proportionate amounts may be equally applicable to a specific system. At the first adaptation, the temperature set point will still show 80 in the display 12, but the NPRG value has been raised to 165.

Because the program number of 165 is greater than the program number of 153 at the set value of 80, the vehicle operator will be 12 counts too high. In other words, although the vehicle operator would have been comfortable at a $T_{SET}$ value of 80 at the original correction constant K and ACOR table value, the system has changed those values so that the operator is no longer comfortable for that $T_{SET}$ value. The vehicle operator will then adjust the $T_{SET}$ value to 78 that again generates an NPRG value of 153 as indicated at the second adjustment point. The system will then add (78–75)× 5×25% to the correction constant K and the ACOR table value at the current outside temperature. This will generate a new program number of 161. Now the vehicle operator is 8 counts too high, and therefore will adjust the $T_{SET}$ value to 77, again setting an NPRG value of 153. As is apparent from this process, the system will eventually cause $T_{SET}$ to be approximately 75 at the driver's comfort level. The system will make a final overall adjustment to the correction constant K and the ACOR table at the specific ambient air temperature.

The discussion above is directed to an overview of altering the $T_{SET}$ value for vehicle comfort for a specific vehicle operator. It is noted that the adaptation gradually occurs over time in that as the system adapts to the vehicle operator's comfort level at one ambient air temperature, the system may also be adapting to the comfort level of the vehicle operator at other ambient air temperatures.

A computer program for implementing the adaptive control system of the present invention is event oriented in that certain events cause the system to act. These events include turning the vehicle on, turning the vehicle off, changing the temperature setting, and response to various timers. Since the adaptive ECC system is computer controlled, any reference below to periodically determining whether an event has occurred is on computer time, i.e., a few milliseconds.

Figure 3:
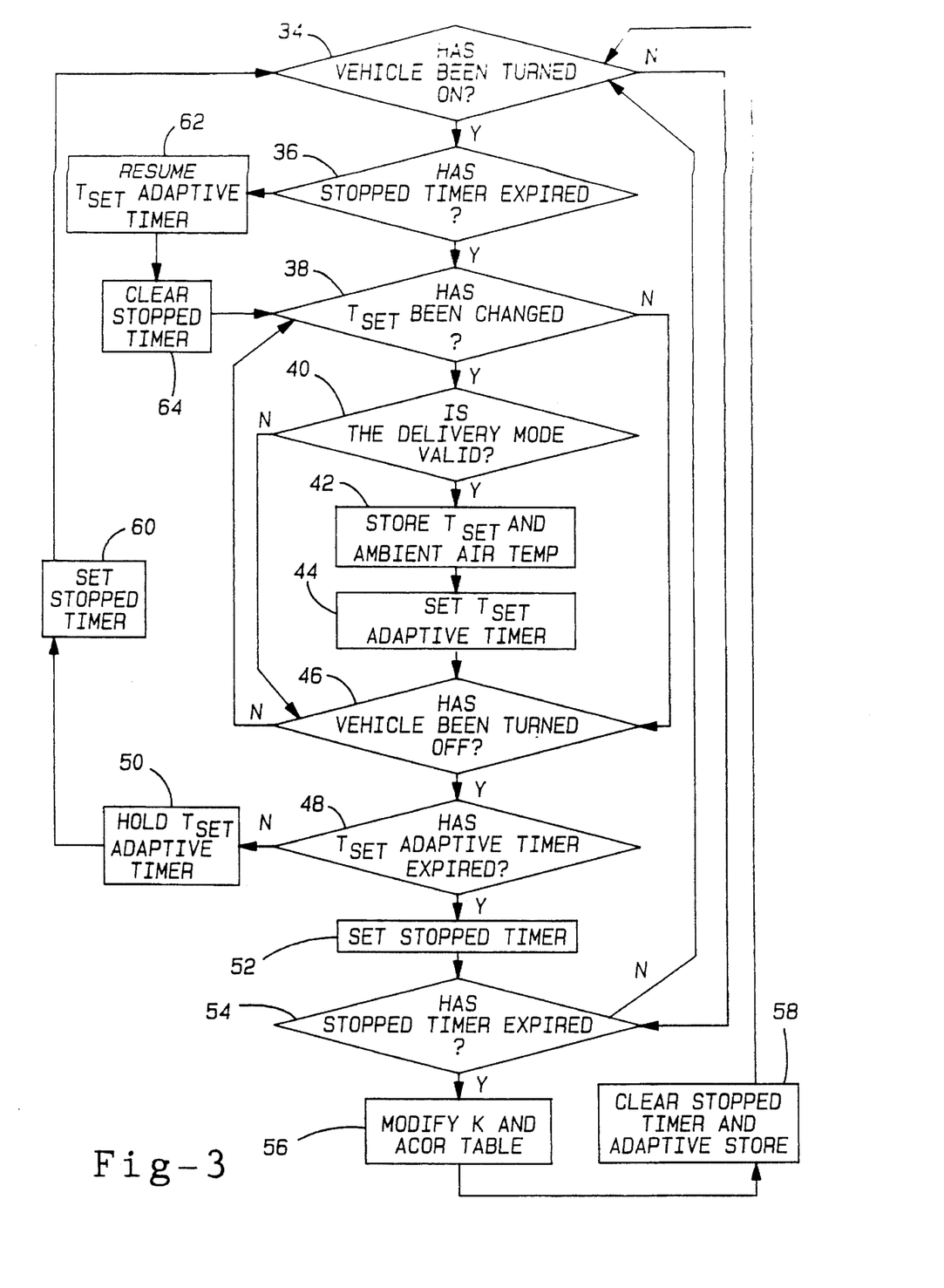
FIG. 3 is a flowchart diagram depicting the process of adapting air mixture delivery to a particular vehicle operator's comfort level according to a preferred embodiment of the present invention.

FIG. 3 shows a flowchart diagram 32 of a procedure for implementing the process as discussed above for changing the correction constant K and the ACOR table after adjustments to the temperature setting by a vehicle operator. As discussed above, the adaptive climate control system of the present invention will respond to adjustments to the temperature setting. However, the system does not immediately change the correction constant K and the ACOR table value relative to the operator's adjustment of the temperature setting. An adjustment by the vehicle operator of the temperature setting will cause a validation timer to be activated so that the system is not continually updating the ACOR table until it is sure that the temperature setting is at the operator's comfort level. Further, the system does not change the correction constant K and the ACOR table with respect to the new temperature setting until the vehicle has been shut off. Once the vehicle has been shut off, a stopped timer is then initiated so as to provide for situations when the time for a valid adjustment has expired, but the vehicle operator has only left the vehicle for a brief period of time. The flowchart diagram 32 attempts to show how each of these different events are implemented into an appropriate process according to the invention.

When the vehicle has been turned on, as represented by box 34, the system determines if the stopped timer has expired as represented by box 36. If the stopped timer has expired, then it is assumed that any previous valid temperature setting adjustments have been adapted into the system as described above. In other words, the vehicle has been off for a long enough time to validate changes in the temperature setting. If the vehicle is on and the stopped timer has expired, the system will periodically look for changes in the temperature setting as represented by box 38. If the vehicle operator has changed the temperature setting by the control 14, the system will determine if the delivery mode is valid as represented by box 40. In certain situations, the system will not cause adaptations to the temperature setting to be made because they are extreme conditions that may skew the adaptations. In one example, these conditions occur when the vehicle operator has initiated the AC recirculation or defrost modes.

If the system determines that the delivery mode is valid, then the system will store the new temperature setting and the ambient air temperature in an adaptive memory as represented by box 42. Additionally, the system will set a temperature setting adaptive timer as represented by box 44. In a preferred embodiment, the temperature setting adaptive timer is approximately twenty minutes. Twenty minutes has been selected as the time of an average commute. The vehicle operator must maintain the temperature setting for twenty minutes in order for it to be valid. If the system determines the delivery mode is invalid, then the process will not store the temperature setting value and the ambient air temperature. When the vehicle is turned on, the system will be periodically determine if the vehicle has been turned off as represented by box 46. If the vehicle has not been turned off, the system will continue to periodically determine if the vehicle operator has changed the temperature setting value again as discussed above with reference to the box 38. As is apparent, the system continuously looks for the event of whether the operator has changed the temperature setting or the vehicle has been turned off, after the vehicle has been turned on.

If the system determines that the vehicle has been turned off, the system will then determine if the temperature setting adaptive timer has expired as represented by box 48. If the system determines that the temperature setting adaptive timer has not expired, then the system will hold the temperature setting timer as represented by box 50. If, however, the temperature setting adaptive timer has expired, then the system will set the stopped timer as represented by box 52. In a preferred embodiment, the stopped timer is about 2 hours. After the system has set the stopped timer, the system will periodically determine if the stopped timer has expired as represented by box 54 or whether the vehicle has been turned on. If the stopped timer has expired, then the system will modify the correction constant K and the ACOR table with respect to the stored temperature setting value and ambient air temperature, as represented by box 56, to make the vehicle operator comfortable at a temperature setting of 75±1 as discussed above. If the vehicle is turned on before the stopped timer has expired, the process will pick up from the step of determining whether the vehicle has been turned on as discussed above. Once the correction constant K and ACOR table have been updated, the system will clear the stopped timer and the adaptive store memory as represented by box 58. The system will continue to periodically determine if the vehicle has been turned on.

As discussed above, there will exist a time when the vehicle has been turned off and the temperature setting adaptive timer is running. If the vehicle operator turns the vehicle back on a short time later, the temperature setting change may be still valid. The temperature setting adaptive timer is therefore held if it is running, as represented by the box 50, and the stopped timer is initiated as represented by box 60. When the vehicle is then turned on, the system will determine if the stopped timer has expired by the box 36. If the stopped timer has not expired, the system will resume the temperature setting timer as represented by box 62. It will then clear the stopped timer as represented by box 66 and the system will be placed back into the loop of determining whether the temperature setting has been changed and the vehicle has been shut off as discussed above. As mentioned above, no changes are made to the correction constant K for the ACOR table while the vehicle is running. Therefore, if the vehicle operator adjusts the temperature setting and the $T_{SET}$ adaptive timer expires, and the vehicle operator again adjusts the temperature setting before the vehicle is turned off, then the previous values in the adaptive store memory are eliminated, and the new correction constant K and ACOR table values are stored in the adaptive store memory.

Next, the adaptation of the blower speed control will be discussed. The prior art Delco Electronics automatic ECC system discussed above controls the blower speed as a function of air delivery mode, NPRG value, snow ingestion, solar load and vehicle speed. The air delivery mode acts as a minimum limit on the blower speed. Air delivery mode limits are critical because they limit condensation and force cold defrost air over the vehicle operator's head. Increasing the solar load increases the vehicle cooling requirements. The solar load is a function of the current solar sensor voltage and the current blower speed. High vehicle speed increases the air pressure at the inlet manifold of the vehicle. To maintain a constant air flow rate within increased vehicle speed, the blower control voltage needs to be decreased. A vehicle speed correction of blower speed makes the air flow more constant.

In addition to the system requirements discussed above there are also human factors that are of concern. Noise from high blower speeds may act to annoy certain vehicle operators even though the blower speed is optimum from an engineering perspective. The adaptive ECC system of the present invention recalibrates the automatic blower control to the vehicle operator's desires. Vehicle operators who cannot tolerate high fan noise and/or a large amount of air circulation, can teach their adaptive ECC system to operate at lower blower speeds than the calibrated lower speeds. Likewise, vehicle operators who run their adaptive ECC system in the air conditioning mode, or who like high blower speeds, can teach their ECC system to operate with higher blower speeds.

Figure 4:
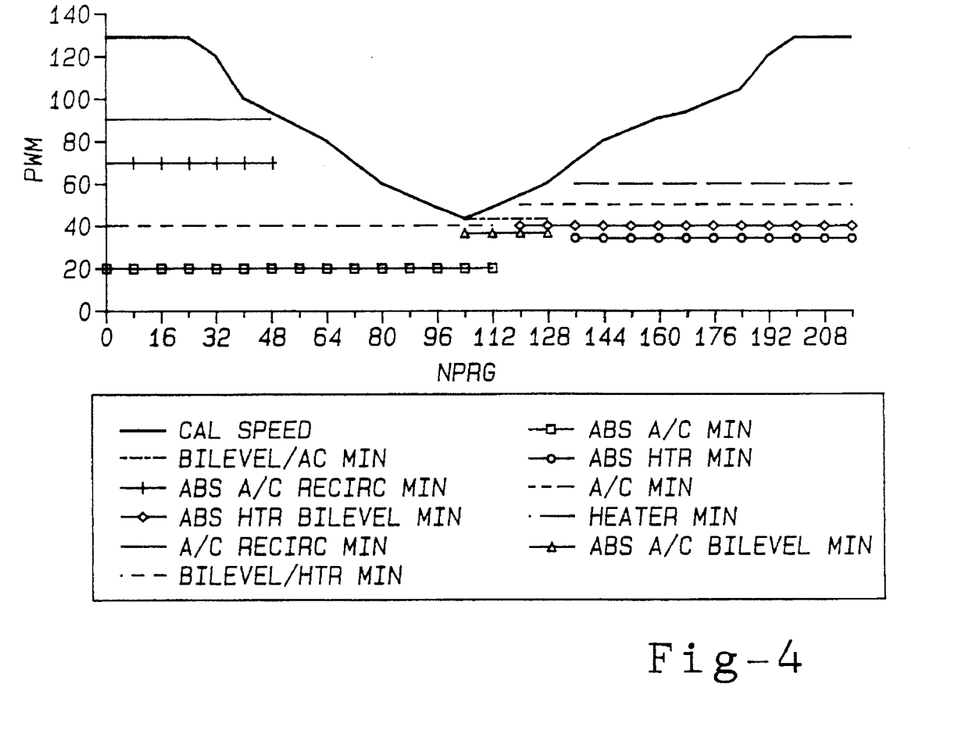
FIG. 4 is a graph depicting blower speed on the vertical axis with respect to a system program number on the horizontal axis and absolute blower speed minimums.

As discussed above, the NPRG value also sets the blower speed in the automatic mode. The NPRG value selects a certain value from a thirty-two point blower table that generates the appropriate blower speed. Each data point in the blower table causes a certain voltage to be applied to a blower motor that generates a blower speed having a pulse width modulation (PWM) output. FIG. 4 is a graph showing the program numbers NPRG along the horizontal axis and the PWM blower output along the vertical axis. The graph line connects the blower table points for the calibrated blower output at each NPRG value as determined by the calibration engineer. Note that the range of the blower output PWM is between about 128 and 50. The graph has a characteristic V-shape that indicates at times when the ambient air temperature $T_{OUT}$ and the inside air temperature $T_{IN}$ are extreme, the blower speed is high. And, likewise, when the NPRG value is in an intermediate region, the blower speed is low. The slope on the left half of the graph must be negative or zero, and the slope on the right half of the graph must be positive or zero. If the vehicle operator makes a blower speed selection that will not hold this rule true, the system will automatically alter the NPRG value to maintain the adaptation within the boundaries of the system.

Blower speed minimums are implemented into both the prior art automatic ECC system and the adaptive ECC system of the invention. This is necessary to prevent blower speeds from being set too low which could cause a number of problems. For example, low interior vehicle body pressure can cause outside air to be forced in around the door and window openings of the vehicle. Further, a reduced amount of air circulation can result in loss of temperature control. The production mode minimums of the prior art ECC system are calibrated to provide an optimally controlled climate for the HVAC calibration engineer. The adaptive ECC system of the present invention allows the calibrated mode minimums to be exceeded, and sets a standard for new absolute mode minimums. These absolute mode minimums are determined independently for each particular vehicle. FIG. 4 also shows the absolute mode minimums for blower speed for the particular modes of the adaptive ECC system according to the invention.

As discussed above, when the adaptive ECC system of the present invention is in the automatic mode, and is not in one of the modes considered a mode for extreme ambient conditions, the adjustments the vehicle operator makes to the blower speed causes these changes to affect the blower speed for a particular NPRG value for the next time the adaptive ECC system is in the automatic mode and that particular NPRG value is calculated. As will be discussed in greater in detail below, when the vehicle operator makes an adjustment to the blower speed, the adaptive ECC system will make an adjustment to the blower table at that NPRG value if the change in the blower speed is considered valid.

Figure 5:
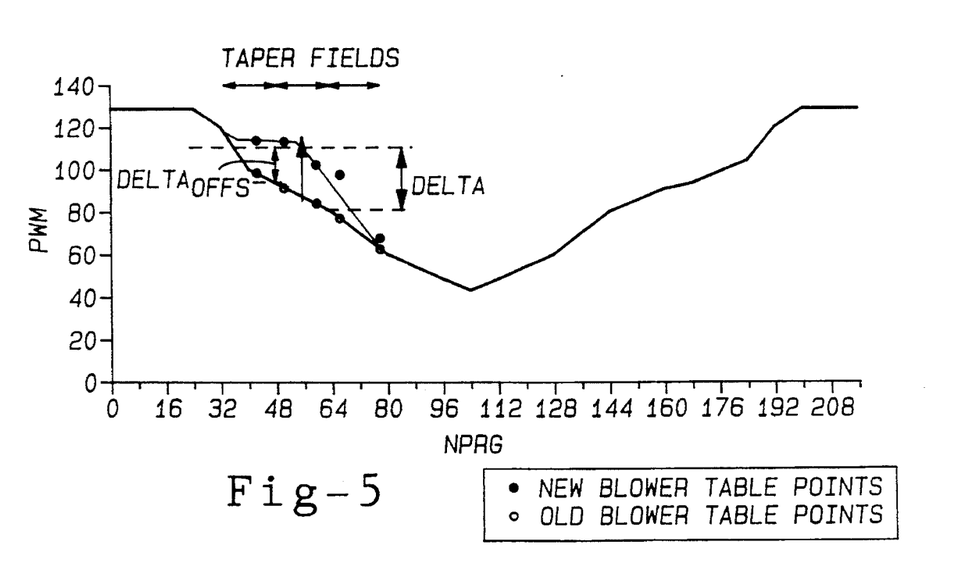
FIG. 5 is a graph showing an adapted blower speed at a range of system program numbers according to a preferred embodiment of the present invention.

FIG. 5 shows how the graph line of FIG. 4 changes around a particular NPRG value when a change in the blower speed by the vehicle operator is validated. At a calculated NPRG value of approximately 60, the vehicle operator has increased the blower speed so that a blower delta is generated as the difference of the PWM value at the original blower speed and the PWM value at the new blower speed. Validation timers are then set in order to validate the new blower speed at the particular NPRG value. If the vehicle operator adjusts the blower speed before the validation timers have expired, the old blower delta is lost, the new delta is stored, and the validation timer is restarted. If the NPRG value changes during the validation time of the new blower speed, and the vehicle operator has not adjusted the blower speed, the set blower speed will be maintained for all NPRG values, but once the validation timer has expired, only the original NPRG value will be adapted.

FIG. 5 shows a graph line of new blower table points around the NPRG value after validation of the newly set blower speed. Note that the new blower table value at the NPRG value of 60 is less than the original set blower speed represented at the tip of the Delta arrow. As will be discussed below, the adaptive ECC system of the present invention does not adapt the entire blower change as set by the vehicle operator. As is apparent from viewing FIG. 5, a number of blower table values surrounding the newly set blower table value at the specific NPRG value have been changed. These changes reflect the concept that if the vehicle operator wishes the blower speed to be higher at one specific NPRG value, then the same vehicle operator will more than likely want the blower speed changed for the NPRG values surrounding the specific NPRG value. For this reason, the adaptive ECC system of the present invention incorporates taper fields on both sides of the NPRG value that is being adapted. In a preferred embodiment, the invention will adjust the blower table values over three taper fields where the specific NPRG value is centered in the middle taper field as shown. The taper width is the width of each taper field, and is selected by experimentation. A delta$_{OFFSET}$ is provided for each taper field as the percentage of the blower delta applied to all of the blower table values within that taper field. Each blower table value within a taper field is therefore changed by a delta$_{OFFSET}$ value, where the taper field farther from the specific NPRG value has a smaller delta$_{OFFSET}$.

Figure 6:
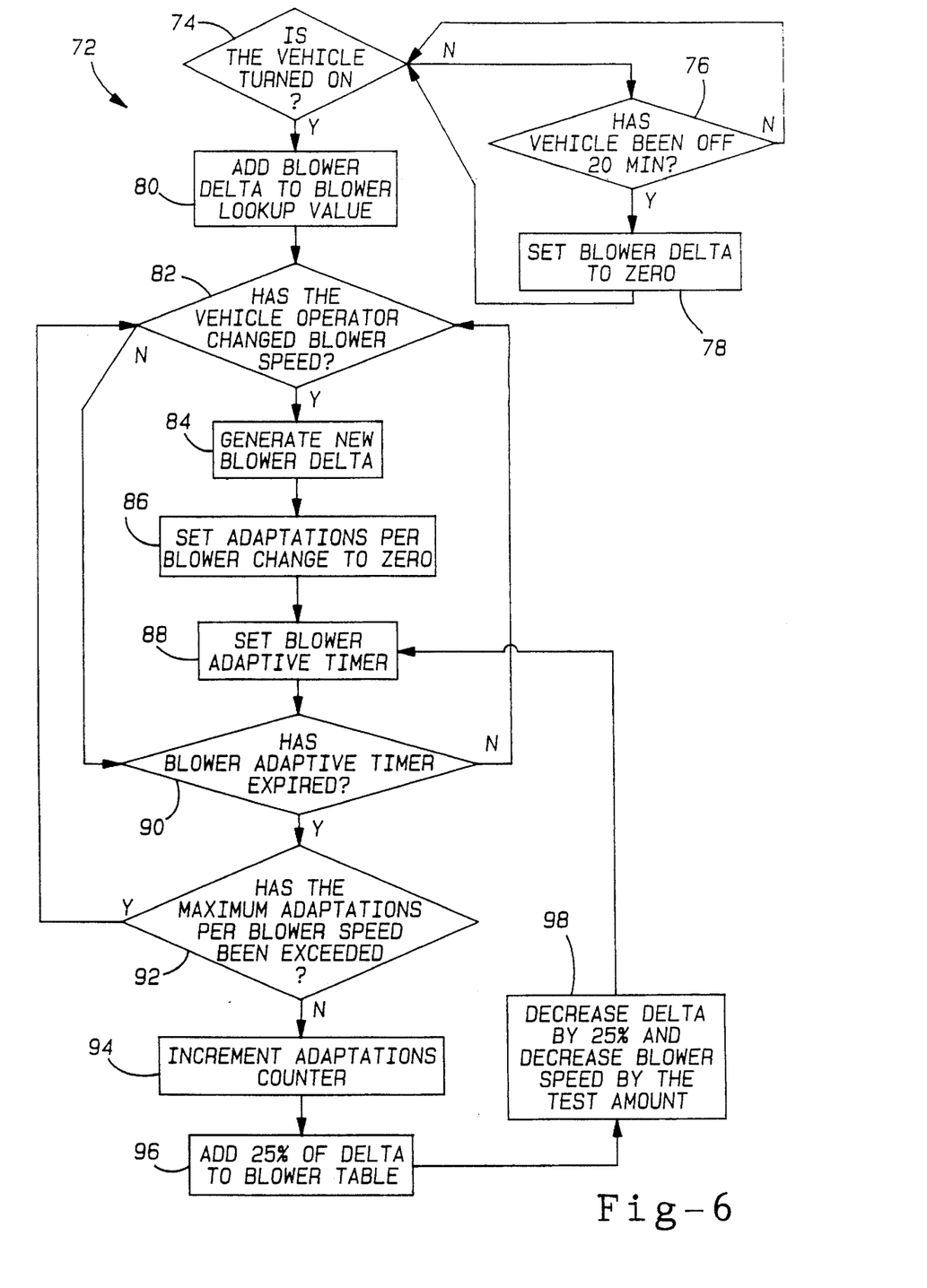
FIG. 6 is a flowchart diagram depicting the process of adapting blower speed to a particular vehicle operator's comfort level according to a preferred embodiment of the present invention.

FIG. 6 shows a flow chart diagram 72 depicting the process by which the blower speed is adapted to the vehicle operator's preference. The blower speed adaptation is also event sensitive as was the temperature setting adaptation. However, the blower speed is adapted while the vehicle is running, as opposed to when the vehicle has been turned off as with the temperature setting adaptation. Box 74 is representative of when the system periodically determines if the vehicle is running. If the system determines that the vehicle is not operating, the system will then determine if the vehicle has been off for a predetermined period of time, here twenty minutes, as represented by box 76. If the vehicle has not been off for the predetermined period of time, the system will continue to periodically determine if the vehicle has been turned on. If the system determines that the vehicle has been off for the predetermined period of time, then the system will set the blower delta to zero for all NPRG values as indicated by box 78. This enables the vehicle operator to turn the vehicle off for a short period of time without invalidating blower speed changes. The system continues periodically determining if the vehicle has been turned on.

Once the vehicle has been turned on, the system first adds the currently stored blower delta value to all of the values of the blower look-up table as represented by box 80. If the vehicle has been off for the predetermined period of time, zero will be added to each blower look-up table value. The system will then periodically determine if the vehicle operator has changed the blower speed, if the system is in an automatic mode, as represented by box 82. It is noted that when the adaptive ECC system is in the automatic mode, adjustments to the blower speed control do not remove the system from the automatic mode, as with the prior art automatic system. When the vehicle operator changes the blower speed, the system generates a blower delta as discussed above as represented by box 84. The system will apply the blower delta to all of the blower table look-up values until the blower speed change has been validated, and the automatic ECC system has adapted the blower delta to the blower table, so as to maintain the ECC system in the automatic mode when the vehicle operator changes the blower speed. Next, the system will set an adaptations per change counter to zero in order to limit the number of adaptations that are made for a certain set blower speed, as represented by box 86, for reasons that will become more apparent from the discussion below. Next, the system will set an adaptive blower timer as represented by box 88. In a preferred embodiment, the adaptive blower timer is approximately 12 minutes. The system will then periodically determine if the adaptive blower timer has expired as represented by box 90. If the blower timer has not expired, the system will continue to periodically determine if the vehicle operator has changed the blower speed control if the vehicle is still on.

If the blower timer has expired, the system will then determine if the maximum adaptations per set blower speed has been exceeded as represented by box 92. As will be discussed in further detail below, the system only adapts a portion of the set blower speed each time the adaptive timer is set so as to gradually adapt the blower table value to the set blower speed. However, in order to limit the number of times these adaptations occur so as to prevent large changes in the original blower table value, a maximum adaptations per blower speed is incorporated. In a preferred embodiment, only three adaptations per set blower speed will be allowed. If the number of adaptations per blower speed has not been exceeded, then the system will increment the adaptations counter as represented by box 94.

Next, a certain percentage of the blower delta is added to the blower table at the particular NPRG value, as well as the same percentage of delta$_{OFFSET}$ to each of the taper fields, as discussed above, as represented by box 96. In a preferred embodiment, 25% of the blower delta is added to the blower table at the NPRG value, although other values could be used without departing from the scope of the invention. Next, the blower delta is decreased by the percent of the blower delta that was added to the blower table, and the blower speed is reduced by a test percentage, also 25% in the preferred embodiment, as represented by box 98. In this manner, the blower table look-up value at the particular NPRG value is moved closer to that which was set by the vehicle operator, and the actual blower speed is reduced by a proportional amount of the change made by the vehicle operator in order to compensate for the premise that a person will normally overstate their desired blower speed. Consequently, not only does the system move the blower table look-up value closer to that as set by the vehicle operator, the system will also move the blower speed set by the vehicle operator to the original NPRG value.

Once the system has decreased the blower delta and the blower speed, the system will then set the adaptive timer again. If the vehicle operator has not changed the blower speed, the system will act on the new blower delta in the same manner as the original blower delta was adapted the number of times the adaptations counter will enable the system to act on this delta. If the vehicle operator changes the blower speed, then the new blower delta is added to the remaining blower delta.

Figure 7:
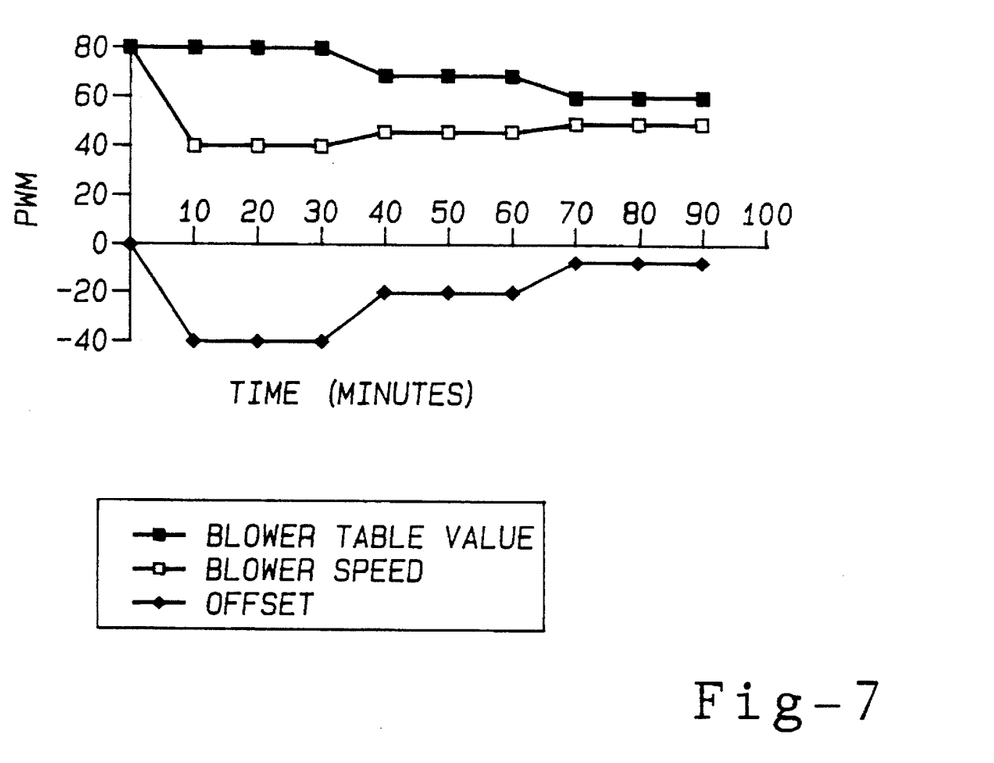
FIG. 7 is a graph showing an adaptation of one NPRG blower point over time.

FIG. 7 shows a graph depicting blower adaptations over time. The horizontal axis shows time in minutes and the vertical axis depicts blower PWM. Graph lines for the blower table value, the blower speed and an offset as the change in the blower PWM are shown. At 10 minutes, the vehicle operator has reduced the blower speed by approximately 40 PWM. If the vehicle operator maintains this blower speed, then at 40 minutes, the system adapts a percentage of the blower delta to the blower table and reduces the blower delta the percentage, i.e., lessens the offset, such that the blower speed is slightly decreased towards the vehicle operator's setting. Also, the blower speed is increased the percentage toward the original blower speed. At 70 minutes, the offset is again reduced, the blower speed is slightly increased, and the blower table value is slightly decreased. Because a percentage of the blower delta is taken at each adaptation, the amount of the change in the blower speed is reduced from the previous change.

The foregoing discussion discloses and describes merely exemplary embodiments of the present invention. One skilled in the art will readily recognize from such discussion, and from the accompanying drawings and claims, that various changes, modification and variations can be made therein without departing from the spirit and scope of the invention as defined in the following claims.

The embodiments of the invention in which an exclusive property or privilege is claimed are defined as follows:

1. A method of adapting an electronic climate control system associated with a vehicle to the preferences of an operator of the vehicle, said method comprising the steps of:

calibrating the electronic climate control system to provide a predetermined air mixture delivery and blower speed for each program number of a range of program numbers, said program numbers being determined by a combination of vehicle parameters that effect the climate within the vehicle, said parameters including a temperature set point controlled by the vehicle operator;

recalibrating the air mixture delivery for a particular program number that is based on current vehicle parameters when the vehicle operator adjusts the temperature set point; and recalibrating the blower speed for a particular program number that is based on current vehicle parameters when the vehicle operator adjusts a blower speed control that controls the blower speed.

2. The method according to claim 1 wherein the step of recalibrating the air mixture delivery includes the steps of storing the temperature set point and a value indicative of the ambient air temperature around the vehicle when the vehicle operator adjusts the temperature set point, activating a temperature set point adaptive timer, and modifying an ambient air corrections table when the adaptive timer has expired, said ambient air corrections table being a table including a series of data points where each data point represents a range of ambient air temperatures, wherein the ambient air temperature is a vehicle parameter.

3. The method according to claim 2 further comprising the step of modifying a vehicle constant when the ambient air corrections table is modified, said vehicle constant being a constant vehicle parameter used to determine the program number.

4. The method according to claim 2 wherein the step of recalibrating the air mixture delivery includes the steps of periodically determining if the vehicle has been turned off, determining whether the adaptive timer has expired when it has been determined that the vehicle is off, activating a stopped timer if the adaptive timer has expired, and determining whether the stopped timer has expired after the stopped timer has been activated, wherein the step of modifying the ambient air corrections table includes modifying the ambient air corrections table after the stopped timer has expired.

5. The method according to claim 2 wherein the step of recalibrating the air mixture delivery includes the steps of determining whether the vehicle has been turned off, determining whether the adaptive timer has expired when it has been determined that the vehicle is off, storing a current value of the adaptive timer if the adaptive timer has not expired, and setting a stopped timer after the step of storing the current value of the adaptive timer.

6. The method according to claim 5 wherein the step of recalibrating the air mixture delivery includes the steps of determining if the vehicle is turned on, determining if the stopped timer has expired after it has been determined that the vehicle is on, resuming the adaptive timer if the stopped timer has not expired and clearing the stopped timer.

7. The method according to claim 1 wherein the step of recalibrating the air mixture delivery includes determining whether a climate control mode is in an extreme climate mode after it has been determined that the temperature setting point has been changed.

8. The method according to claim 1 wherein the step of recalibrating the blower speed includes the steps of determining if the vehicle operator has changed the blower speed from an original blower speed to a new blower speed, generating a blower delta as the difference between the output of a vehicle blower at the new blower speed and the output of the vehicle blower at the original blower speed for the particular program number and adding a percentage of the blower delta to a blower value associated with a blower look-up table for the particular program number, said blower table including blower values that give a blower speed for each program number.

9. The method according to claim 8 wherein the step of recalibrating the blower speed includes the steps of setting a blower adaptive timer when the blower delta is generated and adding the percentage of the blower delta to the blower table after the blower adaptive timer has expired.

10. The method according to claim 9 wherein the step of recalibrating the blower speed includes the steps of reducing the blower delta the percentage of the blower delta that was added to the blower table, reducing the blower speed the percentage of the blower delta that was added to the blower table, resetting the blower adaptive timer, adding the percentage of the reduced blower delta to the blower table after the blower adaptive timer has expired, and reducing the reduced blower delta and the blower speed the percentage of the blower delta when the percentage of the blower delta is added to the blower table.

11. The method according to claim 10 wherein the step of recalibrating the blower speed includes the step of limiting the number of times the percentage of the blower delta is added to the blower table.

12. The method according to claim 8 wherein the step of recalibrating the blower speed includes the steps of determining if the vehicle has been turned off for a predetermined period of time and setting the blower delta to zero if the vehicle has been turned off for the predetermined period of time.

13. The method according to claim 8 wherein the step of adding a percentage of the blower delta to the blower table for the particular program number includes adding a portion of the percentage of the blower delta to surrounding blower table values within taper fields around the program number.

14. The method according to claim 1 wherein the step of recalibrating the blower speed includes the step of preventing the blower speed from being reduced below an absolute minimum with respect to an air delivery mode.

15. A method of adapting an electronic climate control system associated with a vehicle to the preferences of an operator of the vehicle, said method comprising the steps of:

calibrating the electronic climate control system to provide a predetermined air mixture for each program number of a range of program numbers, said program number being determined by a combination of vehicle parameters that effect the climate within the vehicle, said parameters including a temperature set point controlled by the vehicle operator;

adjusting the temperature set point from an original temperature set point to a first new temperature set point, said original temperature set point having an original program number and said first new temperature set point generating a new program number;

adapting the new program number to a first adapted program number, wherein the difference between the original program number and the first adapted program number is greater than the difference between the original program number and the new program number;

readjusting the temperature set point to a second new temperature set point, wherein the second new temperature set point substantially generates the new program number; and adapting the first adapted program number to a second adapted program number, wherein the difference between the original program number and the first adapted program number is greater than the difference between the original program number and the second adapted program number.

16. The method according to claim 15 further comprising the steps of continuing to adjust the temperature set point and adapt the program number until the temperature set point is substantially equal to the original temperature set point and the program number is substantially equal to the new program number.

17. The method according to claim 16 wherein the original temperature set point is approximately 75.

18. The method according to claim 15 wherein the steps of adapting the new program number and adapting the first adapted program number includes modifying an ambient air corrections table, said ambient air corrections table being a table including a series of data points where each data point is representative of a range of ambient air temperatures, wherein the ambient air temperature is a vehicle parameter.

19. The method according to claim 15 wherein the steps of adapting the new program number and adapting the first adapted program number include modifying a vehicle constant, said vehicle constant being a constant vehicle parameter used to determine the program number.

20. A method of adapting an electronic climate control system associated with a vehicle to the preferences of an operator of the vehicle, said method comprising the steps of:

calibrating the electronic climate control system to provide a predetermined blower speed for each program number of a range of program numbers, said program numbers being determined by a combination of vehicle parameters that effect the climate within the vehicle;

adjusting the speed of a blower that controls air delivery to a passenger compartment of the vehicle from an original blower speed to a new blower speed;

generating a blower delta as a difference between the output of the blower at the new blower speed and the output of the blower at the original blower speed for a particular program number;

setting an adaptive timer when the blower delta is generated; and adding a percentage of the blower delta to a blower value associated with a blower look-up table for the particular program number, said blower table including blower table values that give a blower speed for each program number.

21. The method according to claim 20 further comprising the steps of reducing the blower delta the percentage of the blower delta that was added to the blower table, reducing the blower speed, resetting the blower adaptive timer, adding the reduced percentage of the blower delta to the blower table after the blower adaptive timer has expired, and reducing the reduced blower delta and the blower speed the percentage of the blower delta when the percentage of the blower delta is added to the blower table.

22. The method according to claim 21 further comprising the step of determining if the vehicle has been turned off for a predetermined period of time and setting the blower delta to zero if the vehicle has been turned off for the predetermined period of time.

23. The method according to claim 22 wherein the step of adding a percentage of the blower delta to the blower table for the particular program number includes adding a percentage of the blower delta to surrounding blower table values within taper fields around the program number.

24. The method according to claim 20 wherein the step of adding a percentage of the blower delta to the blower table includes the step of preventing the blower delta from reducing the blower speed to a predetermined absolute minimum blower speed.

* * * * *